Sept. 9, 1952  R. T. DOUGHTY  2,609,804
VALVE ROTATING DEVICE

Filed Dec. 31, 1949  2 SHEETS—SHEET 1

Inventor
Robert T. Doughty
By Willito, Helwig & Baillio
Attorneys

Sept. 9, 1952        R. T. DOUGHTY        2,609,804
VALVE ROTATING DEVICE

Filed Dec. 31, 1949        2 SHEETS—SHEET 2

Inventor
Robert T. Doughty
By Willits, Helwig & Baillio
Attorneys

UNITED STATES PATENT OFFICE 2,609,804

VALVE ROTATING DEVICE

Robert T. Doughty, Detroit, Mich., assignor to General Motors Corporation, Detroit, Mich., a corporation of Delaware Application December 31, 1949, Serial No. 136,287

11 Claims. (Cl. 123—90)

This invention relates to internal combustion engines and particularly to poppet valve rotating devices therefor.

It has been appreciated for some time in the art that rotation of the valves during engine operation tends to prevent excessive and uneven carbon deposits thereon with resultant valve sticking and pitting. While many devices for effecting such rotation have been previously proposed they have not won general acceptance principally because their constructions lacked simplicity of design and involved numerous parts with resultant excessive cost of manufacture and uncertainty of trouble-free operation. In the alternative, various expedients such as improvements in materials and cooling for the valves and valve seats have been employed to avoid or at least diminish the pitting and sticking problem. However, with the ever increasing power demands being made of internal combustion engines the need for valve rotation is continually being re-emphasized, and it is the principal object of my invention to satisfy this need with a device for the purpose which is peculiarly adapted for both low-cost manufacture and dependable performance.

This and other objects which will be apparent from a reading of the following description are accomplished by providing a generally annular ring member about the valve stem having a helical interengagement with the stem and an axially engageable clutch surface arranged to coact with a similar clutch surface on the valve guide or other stationary portion of the engine, said annular member having a limited longitudinal movement relative to the guide to permit engagement and disengagement of the clutch surface.

Figure 1:
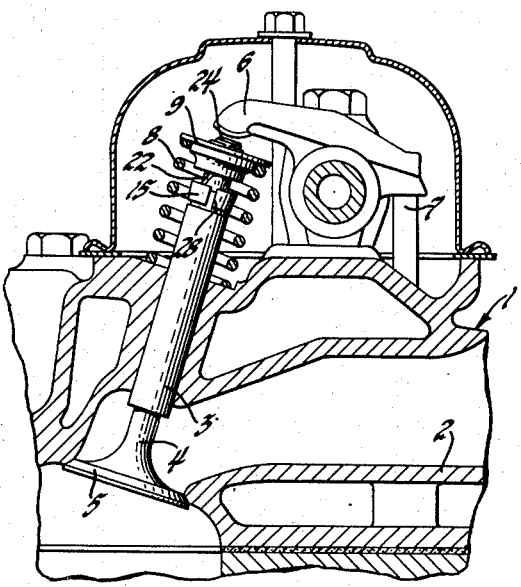
Figure 1 is an elevational view of one form of my invention shown in its relation to the valve operating linkage of an internal combustion engine, a portion only of the engine being shown.
Figure 2:
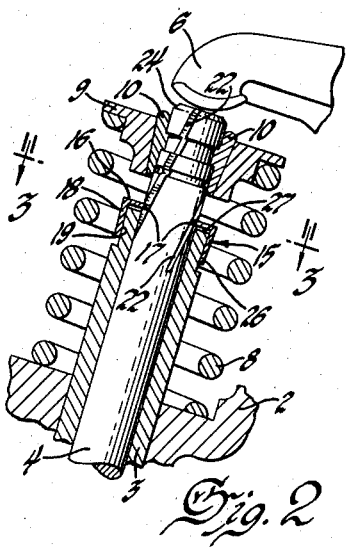
Figure 2 is an enlarged fragmentary view similar to Figure 1 with parts additionally broken away and in section.
Figure 3:
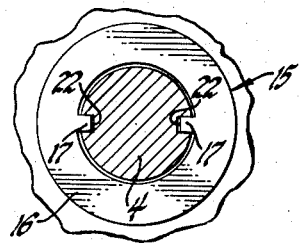
Figure 3 is a sectional view taken substantially on line 3—3 of Figure 2.

Referring to Figures 1, 2 and 3, there is shown a portion of a conventional overhead valve type internal combustion engine 1 including a cylinder head 2 in which is fixed a bushing 3 for guiding the stem 4 of a poppet valve 5. Suitable means for reciprocating the valve 5 include a rocker 6, push rod 7, a cam (not shown) and a compression spring 8, the opposite ends of which are retained by the cylinder head 2 and washer 9 fixed by conventional split locks 10 to the valve stem 4. It will be understood that upward movement of the push rod in response to force transmitted thereto by the cam causes the rocker to rotate counterclockwise as viewed in Figure 1 and drive the valve stem downwardly in its guide, the spring yieldingly accommodating this movement of the parts and effecting the return to their initial positions shown as the cam completes its cycle of operation.

To effect rotation of the valve during the upward or valve closing stroke of its reciprocatory movement I have added a member 15 having a generally flat annular portion 16 which encircles the valve stem 4 and has one or more radially inward extending lugs 17 formed integrally therewith and a downwardly depending peripheral skirt portion 18 which converges or tapers inwardly toward the valve stem to provide an internal clutch surface 19. The outer peripheral surface of the valve stem 4 is provided with helical slots 22 into which the lugs 17 project. The slots 22 extend from the extreme upper end 24 of the valve stem a sufficient distance lengthwise of the valve stem below the annular portion 16 to accommodate their engagement by the lugs 17 during the full stroke of the valve in operation. The upper end of the guide 3 is externally tapered to provide an external clutch surface 26 adapted to coact with the clutch surface 19 of the member 15 in releaseably locking the member against rotation about the longitudinal axis of the stem. The upper end face 27 of the guide serves as an abutment for the flat portion 16 in limiting the downward movement of the member 15, and the engagement of the clutch surfaces 19 and 26 serves to limit upward travel of the member 15. Between these limited positions the member 15 has freedom to shift longitudinally with the valve stem 4 to effect engagement and disengagement of the clutch surfaces, the guide end face 27 accommodating relatively unrestrained rotation of the member 15 under the rotating forces transmitted to the member by the camming action of the slots 22 on the lugs 17 during downward movement of the valve stem.

The skirt portion 18 is longitudinally slit as at 28 (Figure 1) on diametrically opposite sides to enable this skirt portion to be expanded sufficiently for its installation and removal from the guide 3.

In operation, the frictional resistance to sliding movement of the lugs 17 in the helical slots 22 causes the member 15 to shift longitudinally on the guide 3 with each change in direction of longitudinal movement of the valve. Hence, when the valve starts moving downwardly from its position as shown toward valve open position, the member 15 is initially carried downwardly therewith until the flat portion 16 abuts the guide end face 27, disengaging the clutch faces 19 and 26. The continued downward movement of the valve thereupon causes the member 15 to rotate freely on the end face 27 of the valve guide by reason of the camming action of the slots 22 on the lugs 17. Then, upon the valve reaching its lowermost position and starting its upward movement to return to closed position, the member 15 is again initially carried with the valve by reason of the frictional resistance to sliding movement of the lugs in the slots until the clutch surfaces 19 and 26 re-engage each other to limit further upward movement of the member 15 and rotatably lock the member to the valve guide. The valve as it continues its upward movement is then forced to rotate by reason of the camming action of the slots 22 on the lugs 17, sufficient slippage occurring between the lower end of the spring 8 and the cylinder head or between the upper end of the spring and the retainer washer 9, or both, for this purpose. The frictional forces resisting the sliding movement of the lugs in the slots provide a sufficient reactive force acting upwardly on the member 15 to maintain the clutch surfaces 19 and 26 engaged during this continued upward movement of the valve toward closed position.

Figure 4:
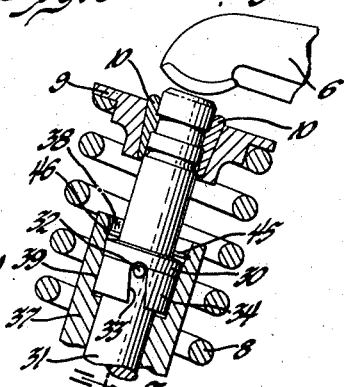
Figure 4 is a fragmentary view similar to Figure 1 but of a modified valve rotating device incorporating the principles of my invention.
Figure 5:
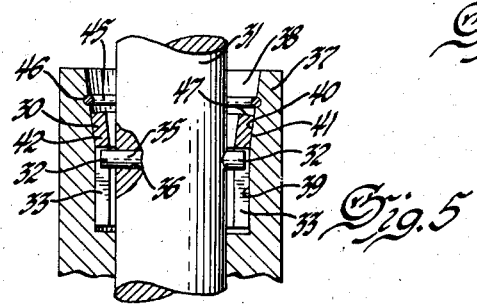
Figure 5 is a sectional view taken substantially on line 5—5 of Figure 4.

Figures 4 and 5 illustrate a modification of the invention in which the annular member 30 functions similarly to the previously described member 15 but differs principally therefrom in that its helical interengagement with the valve stem 31 is provided by radially outward extending protuberances 32 on the valve stem which slidably engage helical slots 33 formed in the side wall of a cylindrical portion 34 of the member 30. As shown, the protuberances 32 may be conveniently formed as opposite ends of a cross pin 35 suitably fixed in a transverse hole 36 in the valve stem 31.

This modification also embodies a different arrangement from that of Figures 1-3 for effecting the clutching engagement of the annular member to the valve guide 37. The upper end of this valve guide is provided with a counterbore 38 having a lower cylindrical portion 39 journaling the cylindrical portion 34 of the member 30 and an outwardly tapered upper portion 40 serving as a clutch surface engageable by the correspondingly tapered clutch surface 41 formed by the upper portion 42 of the member 30. Abutment means for loosely retaining the member 30 within the counterbore is provided in the form of an outwardly expansible snap ring 45 seated in an annulus 46 formed in the tapered clutch surface 40. This ring 45 is located a sufficient distance above the upper end 47 of the member 30 to permit the member to shift upwardly during upward movements of the valve to permit disengagement of the clutch surfaces 40 and 41. Since no expansion or contraction of the member 30 is necessary to permit its withdrawal from the counterbore 38 after removing the snap ring 45, the upper portion 42 of this member may be made circumferentially continuous for increased strength. If desired, the guide 37 may be provided with a pair of diametrically opposite openings through the side walls of its cylindrical counterbore portion 39 to facilitate insertion and removal of the valve stem cross pin 35.

In the operation of this latter form of my invention, the valve is rotated during opening rather than during valve closing by reason of the clutch surfaces 40 and 41 effecting their engagement during the downward or valve opening movements of the stem 4. Otherwise the operation is essentially the same as that previously described for the device of Figures 1-3, frictional resistance to sliding movement of the protuberances 32 in the slots 33 providing reactive force which is sufficient during valve opening to hold the clutch surfaces engaged, and sufficient during valve closing to maintain the end 47 of the member 30 in abutting relation with the snap ring 45.

Figure 6:
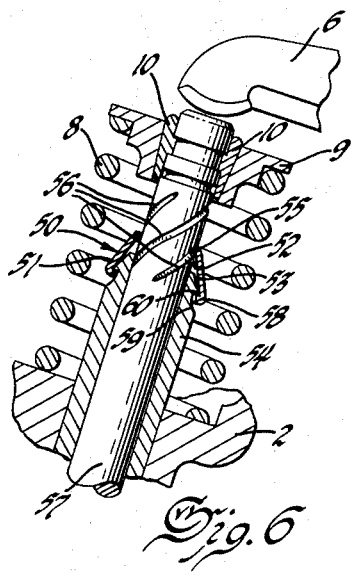
Figure 6 is a fragmentary view similar to Figure 1 but of a further modified valve rotating device embodying the principles of my invention.
Figure 7:
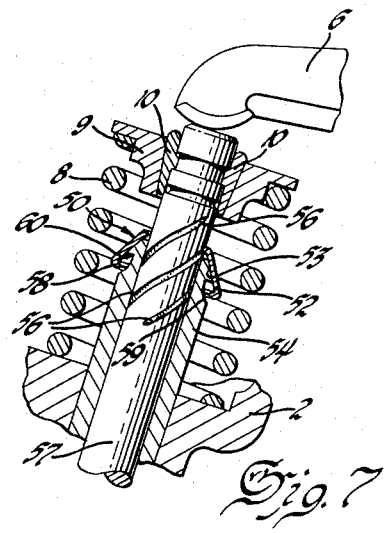
Figure 7 is a view identical to Figure 6 but showing the parts in the positions they assume during a different stage of their operating cycle.
Figure 8:
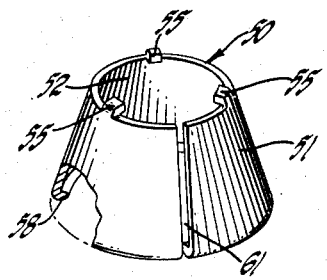
Figure 8 is an enlarged perspective view of a part of the device of Figures 6 and 7.

In Figures 6-8 is illustrated another modification of the invention in which the annular member 50 has a skirt portion 51 converging or tapering inwardly toward the valve stem from its lower end to its upper end to provide an internal clutch surface 52 for engagement with a correspondingly tapered clutch surface 53 formed on the upper end of the valve guide 54. Extending radially inward from the upper end of the member 50 are a plurality (three being shown) of circumferentially spaced-apart lugs 55 which slidably engage helical slots 56 provided in the outer peripheral surface of the valve stem 57, generally on the order of the lugs 17 and helical slots 22 described for the device of Figures 1-3. The lower end of the skirt portion 51 terminates with an internal flange 58 which projects into an annular recess 59 encircling the guide 54 immediately below the clutch 53. The upper wall 60 of this recess is preferably undercut slightly and serves as an abutment engageable by the flange 58 to limit the upward movement of member 50 relative to the guide. It will be observed from inspection of Figure 6, which shows the member 50 in its relaxed state, that its clutch surface 52 is normally inclined at a slightly greater angle to the valve stem axis than is clutch surface 53 on the guide. The member 50 is made of spring steel or equivalent resilient material and is longitudinally slit at 61 so that its lower end may expand relatively to its upper end. Figure 7 shows the member 50 in such expanded condition with the clutch surfaces 52 and 53 fully engaging each other, this relation of the parts having been brought about by the member 50 moving downwardly relative to the guide as the result of the valve stem moving downwardly toward open position. The frictional resistance to sliding movement of the lugs 55 in the slots 56 causes the member 50 to shift longitudinally on the guide 54 with each change in direction of longitudinal movement of the valve stem 57. The clutch surfaces 52 and 53, of course, operate when in engagement with each other to both limit downward movement of the member 50 and rotatively lock the member to the guide during downward movement of the stem toward valve open position. When the valve is moving upwardly toward closed position the clutch surfaces 52 and 53 are disengaged and the inner marginal edge of the flange 58 bottoms in the recess 59 and thereby journals the member about the guide.

One important advantage of this form of my invention over those previously described is that the resilience of member 50 is made use of in assisting the disengagement of the clutch surfaces 52 and 53, thereby enabling their degree of taper to be reduced with resultant increased clutching pressures without encountering clutch "sticking."

Figure 9:
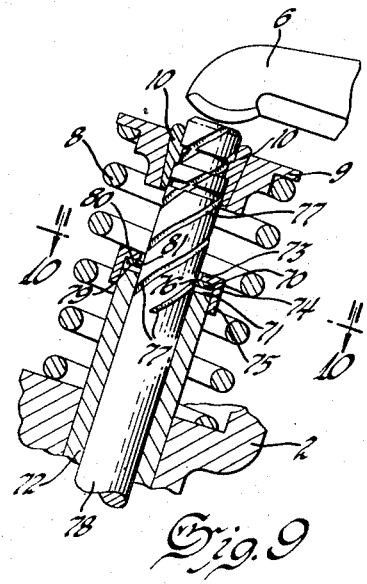
Figure 9 is a fragmentary view similar to Figure 1 but of a still further modified valve rotating device embodying certain principles of my invention.
Figure 10:
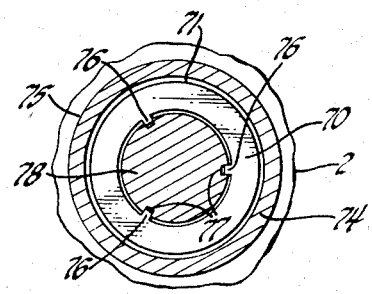
Figure 10 is an enlarged sectional view taken substantially on line 10—10 of Figure 9.

In Figures 9 and 10 I show a still further modification of my invention in which the annular member 70 is made generally flat and is arranged to operate between the upper end face 71 of the guide 72 and the internal flange 73 of a fixed retainer 74 whose depending cylindrical body portion 75 has a press fit on the external periphery of the guide. The member 70 journals at its outer marginal edge on the inner wall of the cylindrical portion 75 and circumferentially spaced around its inner edge are lugs 76 which slidably engage helical slots 77 on the cylindrical periphery of the valve stem 78. Since expansion of the member 70 for assembly and disassembly purposes is not provided for, the slots 77 extend to the upper end of the valve stem as in the case of the device of Figures 1–3. The spacing of the under surface of flange 73 from the guide end face 71 exceeds the thickness of the member 70 somewhat so that member 70 may be in abutment with either but not with both at any one time. The resistance to sliding friction of the lugs 76 in the slots 77 causes the member to shift between the guide end face 71 and the flange 73 with each change in longitudinal direction of the valve stem 78. Either the under surface 79 of the member 70 or the guide end face 71, or both, are roughened to restrict their relative rotation when urged against each other by the downward movement of the stem 78 toward valve open position. Contrariwise, the upper surface 80 of the member 70 and the under surface 81 of the flange 73 both have a smooth finish to accommodate rotation of the member 70 relative to the stationary flange 73 when the member is urged thereagainst during the upward movement of the valve toward closed position. As an alternative construction the member 70 may be laminated, using different materials having high and low coefficients of friction, respectively, for the surfaces 79 and 80.

In operation, the annular member 70 is held from rotating during valve opening movements by the clutching engagement of the member 70 with the guide end face 71, and the stem is forced to rotate in one direction as the result of the camming action of lugs 76 in the slots 77. During valve closing movements the member 70 is out of engagement with the guide end face 71 and the camming action of the slots 77 on the lugs 76 causes a rotation of the member 70 in the opposite direction, which rotation is accommodated by the low coefficient of friction of the surfaces 80 and 81.

Where it is desired that the valve rotate during closing instead of opening, the surfaces 80 and 81 could of course be made rough, and the guide end face 71 and the under surface 79 of member 70 be given a smooth finish for anti-friction purposes.

I claim:

1. In an internal combustion engine having a poppet valve having a stem slidably and rotatably supported in a stationary guide and operatively connected to means for reciprocating the valve, the combination therewith of means for rotating the valve during reciprocation including an annular member adapted to journal on the guide and having a helical connection with the valve stem, means on the guide and member accommodating a predetermined longitudinal movement of the member relative to the guide in response to thrust transmitted to the member by the valve, said last named means including coacting clutch surfaces on the guide and member for holding the member against rotation when the member is thrust in one longitudinal direction by the valve.

2. The combination with a poppet-type valve heaving a stem slidably supported in a stationary guide for longitudinal reciprocation and axial rotation and means for reciprocating the valve, of means for effecting rotation of the valve during reciprocation including an annular member surrounding and helically interengaged with the stem for causing relative rotation therebetween in response to relative longitudinal movement therebetween, axially engageable coacting clutch surfaces on the member and guide effective during longitudinal movement of the stem in one direction to both limit longitudinal movement and prevent rotation of the member relative to the guide, and cooperating abutments on the member and guide limiting longitudinal movement of the member with the stem in the opposite direction to an amount sufficient to effect disengagement of said clutch surfaces and accommodating rotation of the member relative to the guide.

3. In an internal combustion engine, a poppet valve having a stem, means operatively connected to the stem for reciprocating the valve, a stationary guide having a bore journaling the stem and acommodating its reciprocable movement, said guide having a counterbore adjacent one end of the bore including a tapered portion and cylindrical portion, an annular member having a cylindrical portion journaled by the cylindrical portion of the counterbore and a tapered portion adapted to clutchably engage the tapered portion of the counterbore, an abutment removably secured to the counterbore outwardly of the member for loosely retaining the member therein, said cylindrical portion of the member having a helical interengagement with the valve stem effective to transmit thrust from the stem to the member and to cause their relative rotation during reciprocation of the valve.

4. In an internal combustion engine having a poppet valve having a stem slidably and rotatably supported in a stationary guide and operatively connected to means for reciprocating the valve, the combination therewith of means for rotating the valve during reciprocation including a member having a cylindrical portion encircling the stem and journaled on the guide, said portion having a helical slot in the surface thereof facing the stem and a projection on the stem engaging said slot, abutments on the guide limiting longitudinal movement of the member with the valve, one of said abutments accommodating rotation of the member relative to the guide when urged thereagainst by the valve and the other of said abutments being effective to prevent said relative rotation.

5. The combination with a poppet valve and reciprocating means therefor, of means for rotating the valve during reciprocation including a stem fixed to the valve having an internal helical slot, an annular member encircling the stem having a radially inward extending portion slidably engaging the slot, a stationary member arranged to thrustably support and accommodate rotation of the member during longitudinal movement of the stem in one direction with the valve, and coacting clutch surfaces on said annular and stationary members arranged to limit longitudinal movement and prevent rotation of the annular member when said stem is moved in the opposite direction with the valve.

6. In an internal combustion engine having a poppet valve fixed to a stem, means for reciprocating the valve, and a guide slidably supporting and journaling the stem, the combination of means for rotating the valve during reciprocation including a helical cam track on the periphery of the stem, a member slidably engaging the cam track for rotation about the stem during longitudinal movement of the stem in one direction, an abutment on the guide arranged to thrustably support and accommodate rotation of the member during said movement of the stem, and coacting clutch surfaces on the guide and member arranged to thrustably support and prevent rotation of the member during longitudinal movement of the stem in the opposite direction.

7. The combination with a poppet valve and reciprocating means therefor, of means for rotating the valve during reciprocation including a stem fixed to the valve having a helical slot, an annular member of resilient material encircling the stem and having a radially inward extending portion slidably engaging the slot, a stationary member having a tapered annular clutch face coaxial with the stem and a shoulder below the clutch face, said annular member having a longitudinally slit depending skirt portion embracing said clutch face and terminating in an internal flange at its lower end below said shoulder, said skirt portion normally having a lesser taper than said clutch face for accommodating the rotation of the annular member relative to the stationary member except when the valve stem is moved in one longitudinal direction.

8. The combination with a poppet valve having a stem and reciprocating means therefor, of means for rotating the valve during reciprocation including a guide for the stem terminating in an end face, a retainer fixed to the guide having a bore terminating in a shoulder spaced from said end face, and an annular member loosely interposed between said end face and shoulder and in sliding threaded interengagement with the valve stem, said annular member being journaled in said bore, opposite sides of said annular member having different coefficients of friction with respect to said end face and shoulder.

9. The combination with a poppet valve having a stem and reciprocating means therefor, of means for rotating the valve during reciprocation including a guide for the stem having a tapered abutment surface concentric with the stem, an annular member helically connected to the stem and having a resiliently expansible tapered skirt portion surrounding said abutment surface, said skirt portion normally being in abutment with the larger end only of said surface but being yieldable in response to valve stem thrust transmitted through said connection to the member in one direction to effect a mating engagement with said surface, and a shoulder on the guide retaining the member and accommodating its rotation when subjected to valve stem thrust in the opposite direction.

10. In an internal combustion engine having a poppet valve having a stem slidably and rotatably supported in a stationary guide and operatively connected to means for reciprocating the valve, the combination therewith of means for rotating the valve during reciprocation including an annular member adapted to journal on the guide and having a helical connection with the valve stem, means on the guide and member accommodating a predetermined longitudinal movement of the member relative to the guide in response to thrust transmitted to the member by the valve, said last named means including coacting clutch surfaces on the guide and member for holding the member against rotation when the member is thrust in one longitudinal direction by the valve and coacting abutments on the guide and member rotatably supporting the member during longitudinal movement of the valve in the opposite direction, said abutments being out of engagement with each other when said clutch faces are engaged.

11. The combination with a poppet-type valve having a stem slidably supported in a stationary guide for longitudinal reciprocation and axial rotation and means for reciprocating the valve, of means for effecting rotation of the valve during reciprocation including an annular member surrounding and helically interengaged with the stem for causing relative rotation therebetween in response to relative longitudinal movement therebetween, said member and guide having a lost motion connection with each other accommodating and limiting a predetermined relative longitudinal movement therebetween, said connection including axially engageable coacting clutch surfaces on the member and guide effective during longitudinal movement of the stem in one direction to both limit longitudinal movement and prevent rotation of the member relative to the guide and cooperating abutments on the member and guide limiting longitudinal movement of the member with the stem in the opposite direction to an amount sufficient to effect disengagement of said clutch surfaces and accommodating rotation of the member relative to the guide.

ROBERT T. DOUGHTY.

REFERENCES CITED

The following references are of record in the file of this patent:

UNITED STATES PATENTS

| Number | Name | Date |
| --- | --- | --- |
| 1,347,488 | Arnold | July 27, 1920 |
| 1,414,499 | Buck | May 2, 1922 |
| 1,520,273 | Anthony | Dec. 23, 1924 |
| 1,550,530 | Flynn et al. | Aug. 18, 1925 |
| 1,610,409 | Anthony | Dec. 14, 1926 |
| 2,447,443 | Voorhies | Aug. 17, 1948 |